No. 790,316. Patented May 23, 1905.

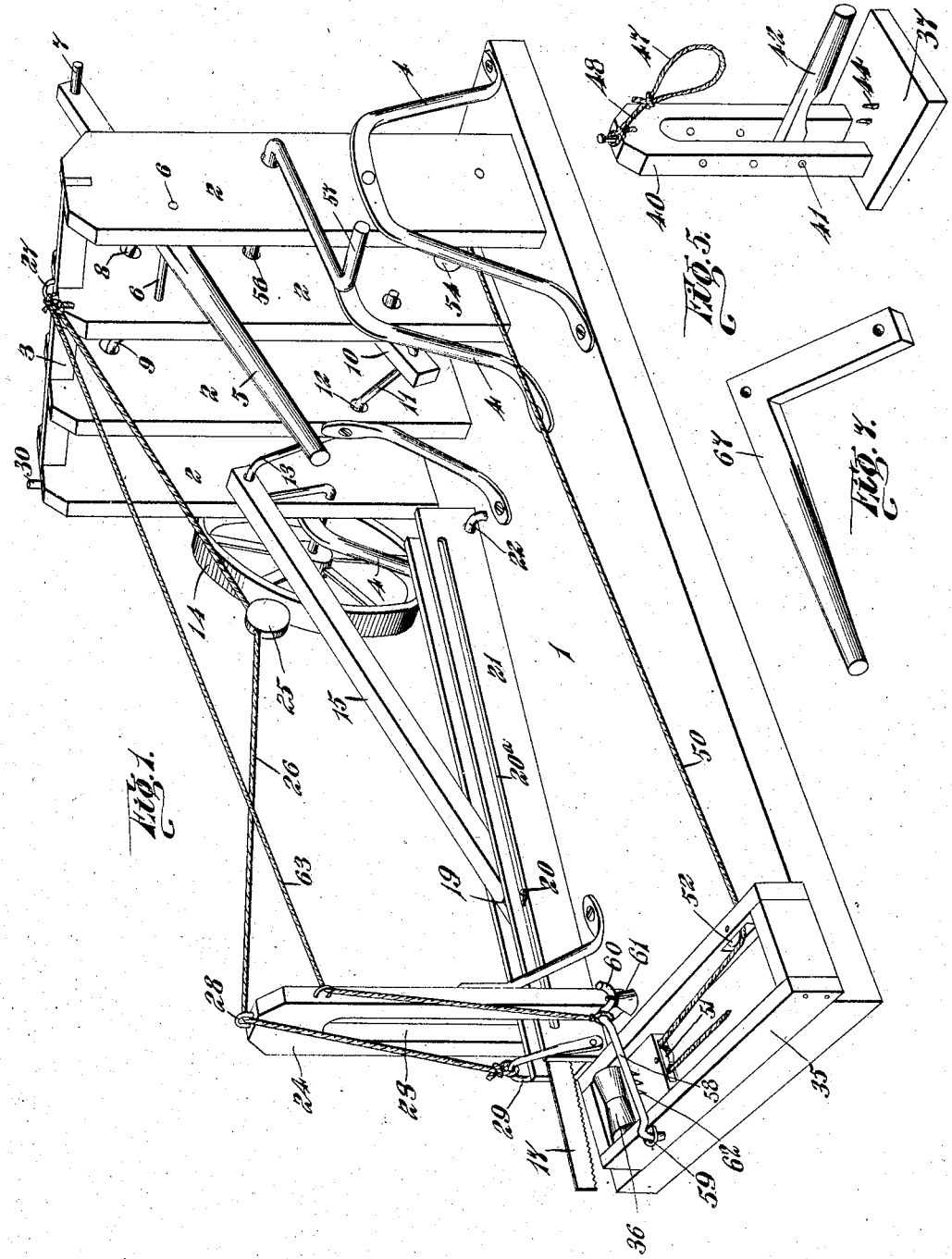

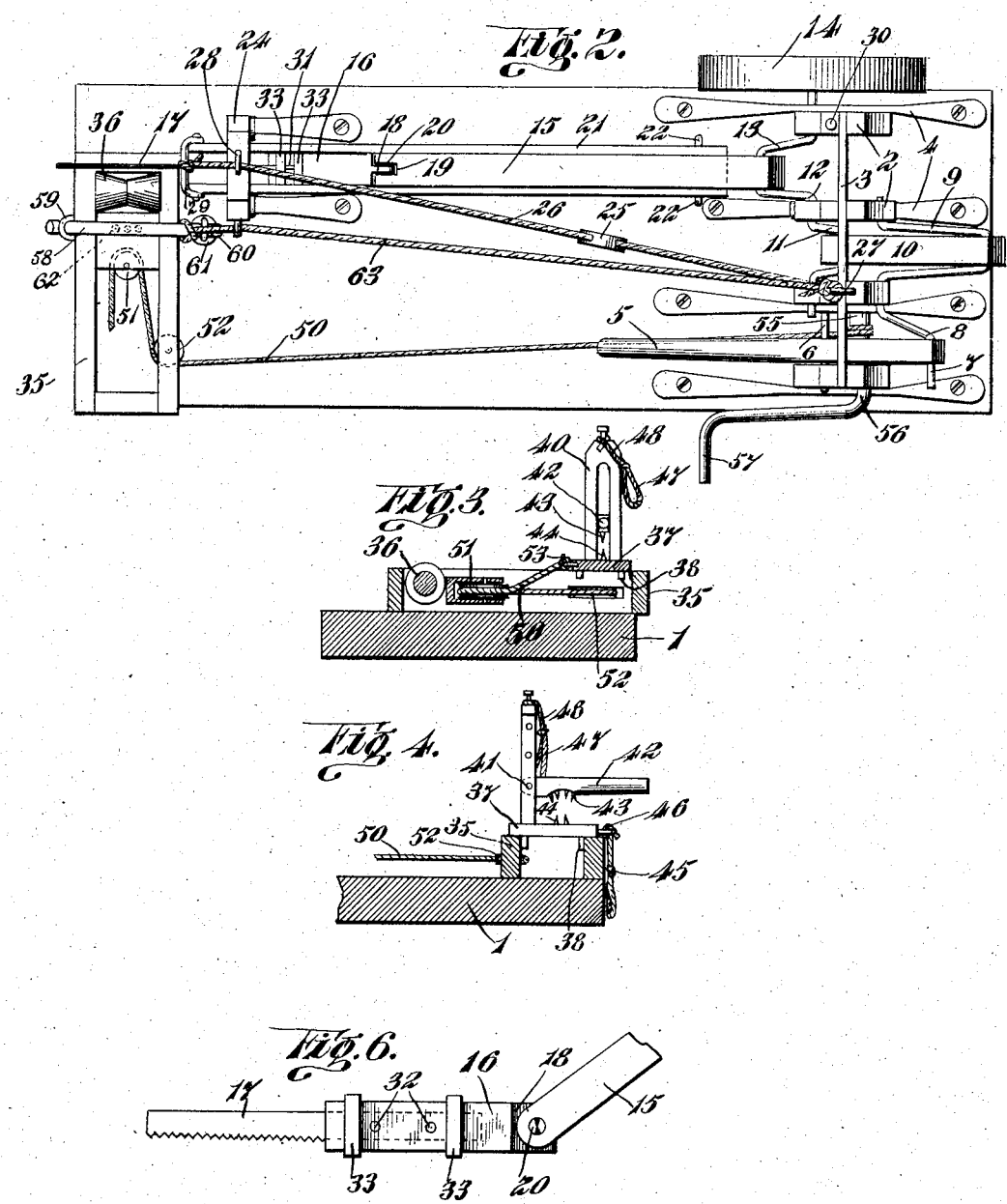

UNITED STATES PATENT OFFICE.

JOHN F. ROSBACK, OF HERMON, NEW YORK.

WOOD-SAWING MACHINE.

SPECIFICATION forming part of Letters Patent No. 790,316, dated May 23, 1905.

Application filed April 8, 1904. Serial No. 202,252.

*To all whom it may concern:*

Be it known that I, JOHN F. ROSBACK, a citizen of the United States, residing in the town of Hermon, in the county of St. Lawrence and State of New York, have invented a new and useful Wood-Sawing Machine, of which the following is a specification.

My invention relates to improvements in wood-sawing machines; and it consists in the novel features of construction, combination, and arrangement of devices hereinafter fully described and claimed.

One object of my invention is to improve and simplify the construction and operation of machines of this character, and thereby render them more efficient and durable in use and less expensive to manufacture.

Another object of my invention is to effect improvements in the means for feeding logs to the saw.

The above and other objects, which will appear as the nature of my invention is better understood, are accomplished by the construction illustrated in the accompanying drawings, in which—

Figure 1 is a perspective view of a hand-operated wood-sawing machine constructed in accordance with my invention. Fig. 2 is a top plan view of the same. Fig. 3 is a vertical longitudinal sectional view through the log-supporting and feeding means. Fig. 4 is a detail vertical transverse sectional view through the same. Fig. 5 is a perspective view of the sliding carriage for feeding the logs to the saw. Fig. 6 is a detail view showing the manner in which the saw is mounted, and Fig. 7 is a perspective view of a modified form of operating-lever which may be substituted for the one shown in Fig. 1 of the drawings.

Referring to the drawings by numeral, 1 denotes a suitable base provided at one end with a series of uprights or standards 2, preferably four in number, as shown, connected at their upper ends by a bar 3 and braced at their lower ends by braces 4, which are secured to said base 1. In these uprights 2 is mounted a saw-operating mechanism which, as shown, comprises a hand operating-lever 5, pivoted intermediate its ends, as at 6, and pivotally connected at one of its ends to a crank-arm 7 upon the crank-shaft 8, mounted or journaled between the two inner uprights 2 and provided between them with a crank 9. Said crank 9 is connected by a rod or pitman 10 to a crank 11, formed upon a second crank-shaft 12, mounted in three of said uprights 2 and provided between two of them with a second crank 13. The crank 9 is of greater size or length than the crank 11, so that as the shaft 8 of the crank 9 is oscillated by the lever 5 the movement of the pitman 10 will be sufficient to cause the crank 11 and its shaft 12 to rotate. Upon the outer end of said shaft 12 is mounted a fly-wheel 14, and to its crank 13 is connected one end of a pitman or connecting-rod 15, the opposite end of which is pivotally connected to a sliding block 16, which carries the saw 17. This pivoted connection is preferably effected by forming said blocks with a tongue 18, which projects between a slotted portion 19 of said pitman 15 and is pivotally secured therein by a pin 20, the ends of which project outwardly into longitudinally-disposed slots 20$^a$, formed in a swinging guide 21, in which said saw-carrying block 16 is slidably mounted. This swinging guide 21 is here shown in the form of a trough-like frame having its inner end pivotally connected to the base 1 by a staple 22 or any other suitable means, so that its outer end may swing in a vertical plane in a slot or opening 23, formed in a standard or upright 24, located adjacent to one side of said base. The outer or free end of this guide 21 may be adjusted at any suitable height by sliding a weight 25 upon a cord or flexible connection 26, which has one of its ends secured to a staple 27 upon one of the uprights 2 and its other end passed through a guide-staple 28 upon the upper end of the upright 24 and secured to a U-shaped link 29, which is pivotally connected to said guide 21, as shown. When it is desired to raise the saw to an inoperative position to permit logs to be placed beneath the same, as hereinafter described, the free end of the guide 21 is swung upwardly and the cord 26 is hooked over or engaged with a pin 30, provided upon one of the uprights 2. The connection of the saw with the block 16 is preferably effected by slotting the latter, as shown at 31, and securing the saw in said slot by pins or bolts 32 and by bands 33, which surround the slotted end of said block, as shown in Fig. 6 of the drawings. Said block slides freely in the guide 21 and is retained therein by the ends of the pins 20, which ends slide in the slots 20ª.

In order to feed the logs or wood to be sawed beneath the saw, I provide at one end of the base 1 a stationary log-supporting table 35, which is here shown in the form of a rectangular frame having journaled in one end a log-supporting roller 36 and having slidably mounted at its outer end a log supporting and feeding carriage 37. This carriage comprises a rectangular block provided upon its under side with guide-studs 38, which engage the sides of the frame or table 35, as clearly shown in Fig. 4 of the drawings, in order to guide the carriage upon the table. Said carriage is provided upon its upper side with a slotted standard 40, in which is adjustably pivoted, as at 41, a log-clamping lever 42, which has formed upon its under side downwardly-projecting spurs or teeth 43 to coact with similar spurs or teeth 44 upon the top of said carriage to hold a log upon the latter. Said lever is adapted to be held in engagement with a log by a rope or other flexible connection 45, which has one end secured in a staple 46 upon said carriage and its other end free to permit it to be tied to the outer end of said lever. In placing a log upon the carriage said lever 42 is adapted to be held out of the way in an elevated position by engaging its outer end with a loop or eye 47, provided at one end of a cord or other flexible connection 48, which has its opposite end secured upon the top of said upright 40. The carriage is adapted to be moved forwardly to feed the log upon it and said roller 36 beneath the saw 17 by means of a rope or cable 50, which is passed about suitable guide-rollers 51 and 52, suitably mounted upon the table 35, and has one of its ends secured to the carriage 37, as shown at 53, and its other end passed rearwardly around a guide-roller 54, mounted between two of the uprights 2, and then wound upon a drum 55, secured upon a shaft 56, formed at one end with an operating crank-handle 57. It will be seen that when said crank 57 is turned in the proper direction said cord or cable 50 will be wound upon the drum 55 and the carriage 37 will be moved toward the saw 17. In order to steady the log upon the roller 36 and hold it stationary while the saw is cutting it, I provide a clamping-lever 58, which has its lower end loosely pivoted, as at 59, to one side of said table 35 and its other end formed with a hook 60, upon which is hung a weight 61. Said lever 58, which is adapted to swing transversely across the table 35, is formed upon its under side with a series of teeth or spurs 62, which are adapted to be forced into the log upon the roller 36 and carriage 35 by the weight 61, as will be readily understood. In order to engage and disengage said lever 59 with and from the log while the operator is standing at the rear end of the machine adjacent to the operating-lever 5 and the crank-handle 57, a cord or flexible connection 63 is provided and has one of its ends secured to the said staple 27 and its other end after being passed through a guide-staple upon said upright 24 secured to the outer or weighted end of said lever 58. It will be seen that by drawing upon said cord 63 said lever may be raised or lowered, as desired, and that by hooking or engaging said cord with the pin 30 said lever may be swung upwardly out of the way to permit a log to be placed upon the roller 36 and carriage 35.

If desired, the right-angular lever 67 (shown in Fig. 7 of the drawings) may be substituted for the lever 5. (Shown in Fig. 1.)

The operation and advantages of my invention will be readily understood from the foregoing description, taken in connection with the accompanying drawings. It will be observed that the operator standing at the rear of the machine may reciprocate the saw 17 by oscillating the lever 5. By drawing upon the cord 26 or sliding the weight 25 thereof he may adjust the saw at any desired height, and by drawing upon the cord 63 and at the same time rotating the crank 57 he may feed or adjust the log under the saw.

While I have shown and described the preferred embodiment of my invention, it will be understood that I do not wish to be limited to the precise construction herein set forth, since various changes in the form, proportion, and the minor details of construction may be resorted to without departing from the principle or sacrificing any of the advantages of this invention.

Having thus described my invention, what I claim as new, and desire to secure by Letters Patent, is—

1. A wood-sawing machine comprising a suitable base, uprights at one end of said base, a three-sided trough pivoted at one of its ends upon said base and formed in its sides with longitudinal slots, a sliding saw-carrying block in said trough, a double-crank shaft mounted in said uprights, a pitman having one end pivotally connected to one of the cranks of said shaft, a pivot passing through the opposite end of said pitman, said saw-carrying block and said slots in said trough to pivot said pitman to said block and to retain the latter in said trough, a second crank-shaft mounted in said uprights, the crank of the latter being of greater length than the other crank of said double-crank shaft, a pitman connecting the latter-mentioned cranks, an operating-lever for oscillating said second crank-shaft, a vertically-disposed slotted guide for the free end of said trough, a cable passed through a guide-eye upon said slotted guide and having one of its ends secured to one of said uprights and its other end secured to the free end of said trough, and a weight slidably mounted upon said cable for the purpose of adjusting said trough, substantially as described.

2. In a wood-sawing machine, the combination of a suitable base, an upright at one end of said base, a saw-guiding element pivotally mounted upon said base, a vertical guide for the free end of said element, a cable passed through a guide-eye upon said vertical guide and having one of its ends secured to said upright and its other end to the free end of said element, a weight slidably mounted upon said cable for the purpose of adjusting said element, substantially as described.

JOHN F. ROSBACK.

Witnesses:
  JAS. E. ROBINSON,
  VERNON A. GREEN.